(12) United States Patent
Kim et al.

(10) Patent No.: US 9,447,841 B2
(45) Date of Patent: Sep. 20, 2016

(54) PEDESTAL AND LAUNDRY PROCESSING APPARATUS HAVING THE SAME

(71) Applicant: SAMSUNG ELECTRONICS CO., LTD., Suwon-si, Gyeonggi-do (KR)

(72) Inventors: Young-hyun Kim, Suwon-si (KR);
Do-haeng Kim, Suwon-si (KR);
Min-hwan Oh, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/729,595

(22) Filed: Jun. 3, 2015

(65) Prior Publication Data

US 2016/0010719 A1    Jan. 14, 2016

(30) Foreign Application Priority Data

Jul. 8, 2014    (KR) .......................... 10-2014-0085418

(51) Int. Cl.
| | |
|---|---|
| *F16F 15/08* | (2006.01) |
| *F16M 11/00* | (2006.01) |
| *F16M 9/00* | (2006.01) |
| *F16M 13/00* | (2006.01) |
| *D06F 39/12* | (2006.01) |
| *D06F 49/06* | (2006.01) |
| *D06F 29/00* | (2006.01) |

(52) U.S. Cl.
CPC ............... *F16F 15/08* (2013.01); *D06F 29/00* (2013.01); *D06F 39/125* (2013.01); *D06F 49/06* (2013.01); *F16M 9/00* (2013.01); *F16M 11/00* (2013.01); *F16M 13/00* (2013.01); *F16M 2200/02* (2013.01)

(58) Field of Classification Search
CPC .. F16M 9/00; F16M 2200/02; D06F 39/125; D06F 39/12; D06F 39/00; D06F 49/06; D06F 37/26; D06F 37/20; D06F 31/00; A47B 95/00
USPC ............... 248/637, 638, 672, 673, 674, 678; 403/408.1
See application file for complete search history.

(56) References Cited

U.S. PATENT DOCUMENTS

| | | | | |
|---|---|---|---|---|
| 2,839,805 | A * | 6/1958 | Bedford, Jr | F16B 2/241 24/581.1 |
| 3,333,799 | A * | 8/1967 | Peterson | B61D 7/32 248/228.6 |
| 3,748,006 | A * | 7/1973 | Levit | F16B 12/28 223/66 |

(Continued)

FOREIGN PATENT DOCUMENTS

| | | |
|---|---|---|
| DE | 3213420 A1 | 10/1983 |
| DE | 19838631 A1 | 3/2000 |

(Continued)

OTHER PUBLICATIONS

Extended European Search Report dated Nov. 26, 2015 in European Patent Application No. 15171969.7.

*Primary Examiner* — Andrew Roersma
(74) *Attorney, Agent, or Firm* — Staas & Halsey LLP

(57) ABSTRACT

A pedestal and a laundry processing apparatus having the same. The pedestal includes a frame portion on which a plurality of legs coupled to a bottom surface of a laundry processor are seated, a housing configured to surround the frame portion, and a plurality of seat portions recessively formed on an upper portion of the housing to form a plurality of leg seat points.

19 Claims, 21 Drawing Sheets

(56) References Cited

U.S. PATENT DOCUMENTS

| | | | | |
|---|---|---|---|---|
| 5,153,052 A | * | 10/1992 | Tanaka | A47B 91/06 108/156 |
| 5,488,808 A | * | 2/1996 | Cahill | E04B 2/7425 292/241 |
| 6,041,721 A | * | 3/2000 | Weston | E05C 19/14 108/64 |
| 6,427,966 B1 | * | 8/2002 | Blumenschein | A47B 91/005 248/646 |
| 6,779,988 B2 | * | 8/2004 | Chen | F04B 39/0044 248/638 |
| 7,874,185 B2 | * | 1/2011 | Graute | D06F 39/12 68/235 R |
| 8,341,981 B2 | * | 1/2013 | Kim | D06F 39/125 312/228 |
| 2005/0172678 A1 | * | 8/2005 | Kim | A47B 91/005 68/3 R |
| 2006/0103281 A1 | | 5/2006 | Cho | |
| 2007/0102618 A1 | * | 5/2007 | Hunke | D06F 39/12 248/673 |
| 2007/0151120 A1 | * | 7/2007 | Tomasi | D06F 29/00 34/601 |
| 2009/0057527 A1 | * | 3/2009 | Jo | D06F 39/125 248/639 |
| 2009/0212673 A1 | | 8/2009 | Park et al. | |
| 2010/0039010 A1 | * | 2/2010 | Hong | D06F 39/125 312/351.3 |
| 2011/0084581 A1 | * | 4/2011 | Cheon | D06F 39/125 312/228 |
| 2013/0162118 A1 | * | 6/2013 | Fan | H05K 7/1488 312/111 |

FOREIGN PATENT DOCUMENTS

| | | | | |
|---|---|---|---|---|
| JP | 353047164 A | * | 4/1978 | D06F 39/12 |
| JP | H09132288 A | * | 5/1997 | B65D 77/26 |
| KR | 1020080032362 A | * | 4/2008 | D06F 39/12 |
| WO | 2008/085012 A2 | | 7/2008 | |

* cited by examiner

US 9,447,841 B2

PEDESTAL AND LAUNDRY PROCESSING APPARATUS HAVING THE SAME

CROSS-REFERENCE TO RELATED APPLICATIONS

This application claims priority under 35 U.S.C. §119(a) to Korean Patent Application No. 10-2014-0085418, filed on Jul. 8, 2014, in the Korean Intellectual Property Office, the disclosure of which is incorporated herein by reference.

BACKGROUND

1. Field

Example embodiments of the present disclosure relate to a pedestal and a laundry processing apparatus having the same, and more particularly to a pedestal, on which a washing machine or a dryer is seated, and a laundry processing apparatus having the same.

2. Description of the Related Art

In general, a pedestal for a washing machine or dryer has a seat structure on which four legs that are coupled to four corners of a bottom portion of the washing machine or dryer are seated.

For example, a pedestal for a washing machine in the related art includes a leg seat plate, a leg fastening member, and a cover portion as a seat structure for legs of the washing machine.

The leg seat plate is fixed to corners of an upper portion of the pedestal using fastening screws, and has projections for fixing the legs. The leg fastening member is manufactured as a substantially handcuff-shaped injection-molded material, and is installed on the leg seat plate to surround the leg of the washing machine, which is seated on the leg seat plate. Then, both sides of the fastening member are fastened again by fastening screws.

After the legs of the washing machine are seated on and fixed to the leg seat structure that is provided on the pedestal, the cover portion for hiding the leg seat structure to secure visibility is positioned on the corner of the pedestal, and then is fixedly fastened to the pedestal through separate screws.

As described above, since the seat structure that is provided on the pedestal in the related art is composed of a large number of components, the manufacturing cost of the product is increased, and as a result, the assembling work to manufacture the product becomes very complicated.

Further, when operators put the heavy washing machine or dryer on the pedestal, not only the legs provided on the bottom portion of the washing machine or dryer, but also the leg seat plate installed on the pedestal may get out of the operators' visual field. Thus, it becomes difficult for the operators to put the legs of the washing machine on accurate seat points. If the legs of the washing machine are not accurately seated on the seat points, but are put on the projections of the leg seat plate, the projections may be easily damaged due to the weight of the washing machine.

SUMMARY

Additional aspects and/or advantages will be set forth in part in the description which follows and, in part, will be apparent from the description, or may be learned by practice of the invention.

The present disclosure has been made to address at least the above problems and/or disadvantages and to provide at least the advantages described below. Accordingly, an aspect of the present disclosure provides a pedestal and a laundry processing apparatus having the same, which can simplify the structure through integral forming of a leg seat portion of a washing machine or a dryer with a housing, and can firmly fix the washing machine or the dryer that is seated on the pedestal in a state where the washing machine or the dryer is pulled toward the pedestal side.

Another aspect of the present disclosure provides a pedestal and a laundry processing apparatus having the same, which can accurately position legs of a washing machine or a dryer onto seat points when the washing machine or the dryer is put on the pedestal.

According to an aspect of the present disclosure, a pedestal includes a frame portion on which a plurality of legs coupled to a bottom surface of a laundry processor are seated; a housing configured to surround the frame portion; and a plurality of seat portions recessively formed on an upper portion of the housing in a body with the housing to form a plurality of leg seat points.

The plurality of seat portions may form openings to expose a part of the frame portion out of the housing.

The plurality of seat portions may be formed to be bent in multistage so that the seat portions become narrower as going from an upper portion of the housing to an inside of the housing.

Each of the plurality of seat portions may include an inclined portion that is downwardly inclined to the inside thereof.

The plurality of seat portions may be in "8"-shaped so that positions of the plurality of legs correspond to different seat points of the laundry processor.

The pedestal may further include a plurality of vibration absorption members arranged on the plurality of seat portions.

Each of the plurality of vibration absorption members may includes first and second anti-skid projections formed on an upper surface and a lower surface thereof to form a plurality of closed curves.

The pedestal may further include a plurality of clamping members each of which has one end that is connected to the laundry processor and the other end that is connected to the frame portion in order to fix the laundry processor to the pedestal.

The plurality of clamping members may pull the laundry processor toward the pedestal side in a locking state.

The plurality of clamping members may simultaneously penetrate a bottom portion of the laundry processor and the upper portion of the housing.

Each of the plurality of clamping members may include one end portion that is separably locked to be fixed to a part of the laundry processor and the other end portion that is screw-fastened to the frame portion.

Each of the plurality of clamping members may include a connection member including a hook portion fixed to a locking protrusion formed on a bottom portion of the laundry processor, a bent portion screw-fastened to the frame portion, and a projection portion provided between the hook portion and the bent portion to press a part of the frame portion; and a fastening screw screw-fastened to the bent portion through the housing and the frame portion.

Each of the plurality of clamping member may include one end portion that is separably locked to be fixed to a part of the laundry processor and the other end portion that is pressingly fixed to a part of the frame portion.

Each of the plurality of clamping members may include a connection member including a hook portion separably fixed to a locking protrusion formed on a bottom portion of the laundry processor; a fixed piece fixed to the frame portion;

and a link having one end hinge-connected to the connection member and the other end hinge-connected to the fixed piece, wherein the connection member maintains the clamping member in a locking state through pressing of the hook portion toward the fixed piece side in a state where the hook portion is fixed to the locking protrusion.

Each of the plurality of clamping members may include a connection member including a hook portion separably locked to be fixed to a first locking protrusion formed on a bottom portion of the laundry processor and a bent portion having a fastening hole formed thereon; and a fastening screw fastened to the fastening hole and having a front end portion that presses the frame portion.

The frame portion may further include a second locking protrusion to fix the fastening screw to the frame portion.

Each of the plurality of clamping members may include a connection member including a vertical rod and a holding piece formed at one end of the vertical rod at right angles to the vertical rod; and a lever member hinge-connected to the other end of the vertical rod, wherein the lever member maintains the clamping member in a locking state through swing toward the frame portion in a state where the holding piece is locked to be fixed to a bottom portion of the laundry processor.

According to another aspect of the present disclosure, a laundry processing apparatus includes a laundry processor; and a pedestal including a frame portion on which a plurality of legs coupled to a bottom surface of a laundry processor are seated, a housing configured to surround the frame portion, and a plurality of seat portions recessively formed on an upper portion of the housing in a body with the housing to form a plurality of leg seat points.

The plurality of seat portions may form openings to expose a part of the frame portion out of the housing.

The laundry processing apparatus may further include a plurality of vibration absorption members arranged on the plurality of seat portions.

The laundry processor may be a washing machine or a dryer, and the plurality of seat portions may be in "8"-shaped so as to correspond to positions of the respective legs of the washing machine or the dryer.

The laundry processing apparatus may further include a plurality of clamping members configured to fix the laundry processor to the pedestal, and each of the clamping members has one end that is fixed to the laundry processor through penetrating of a bottom surface of the laundry processor and the other end that is fixed to the frame portion through penetrating of the upper portion of the housing.

Each of the plurality of clamping member may include one end portion that is separably locked to be fixed to a part of the laundry processor and the other end portion that is screw-fastened or pressingly fixed to a part of the frame portion.

BRIEF DESCRIPTION OF THE DRAWINGS

The above and other aspects, features and advantages of the present disclosure will be more apparent from the following detailed description when taken in conjunction with the accompanying drawings, in which.

DETAILED DESCRIPTION

Figure 1:
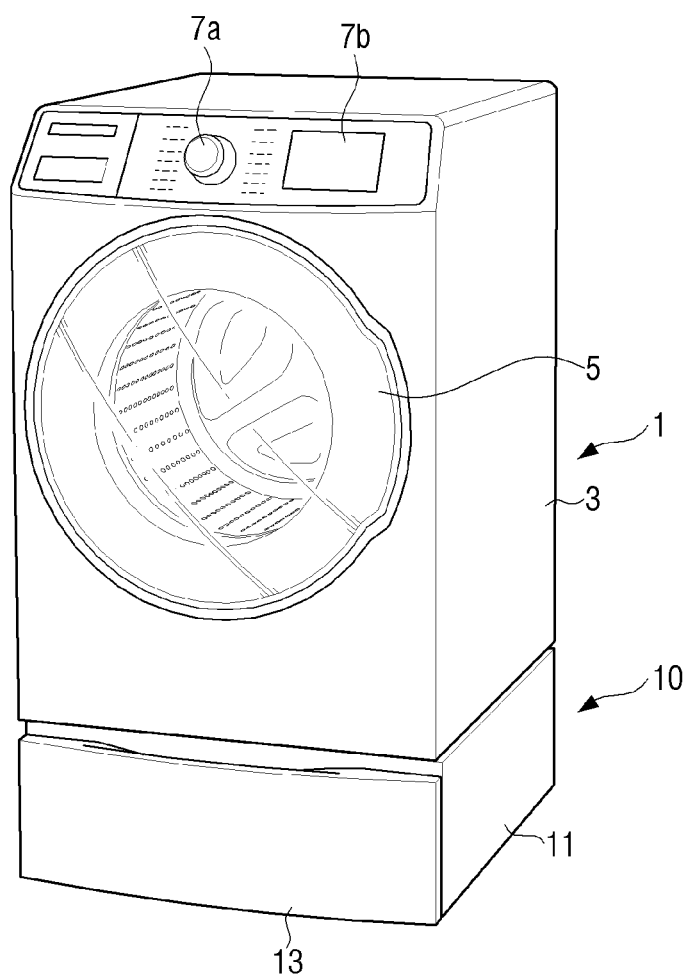
FIG. 1 is a perspective view illustrating a pedestal and a washing machine seated thereon according to an example embodiment of the present disclosure.

Hereinafter, example embodiments of the present disclosure will be described in detail with reference to the accompanying drawings, wherein like reference numerals refer to the like elements throughout. The embodiments to be described hereinafter are exemplary to help a comprehensive understanding of the present disclosure, and in the drawings, to help the understanding of the present disclosure, sizes of some constituent elements may be exaggerated for clarity in explanation.

In an example embodiment to be described hereinafter, it is exemplified that a laundry processor is a drum type washing machine into which laundry is put from the front of the washing machine, however, the present disclosure is not limited thereto. For example, the present disclosure may also be applied to a top-loading type washing machine (not illustrated) into which laundry is put from the upper side or a dryer (not illustrated) having a laundry drying function only.

Referring to FIG. 1, a pedestal 10 and a washing machine 1 having the same according to an example embodiment of the present disclosure are illustrated.

The washing machine 1 includes a door 5 installed in the front side of a main body 3 to put laundry therethrough, a control knob 7a provided on an upper end portion of the front of the main body 3, and a display panel 7b displaying laundry processing status.

The pedestal 10 is arranged on a lower side of the washing machine 1, and includes a housing 11 and a drawer 13 for accommodation that is slidably coupled to the front of the housing 11.

Figure 2:
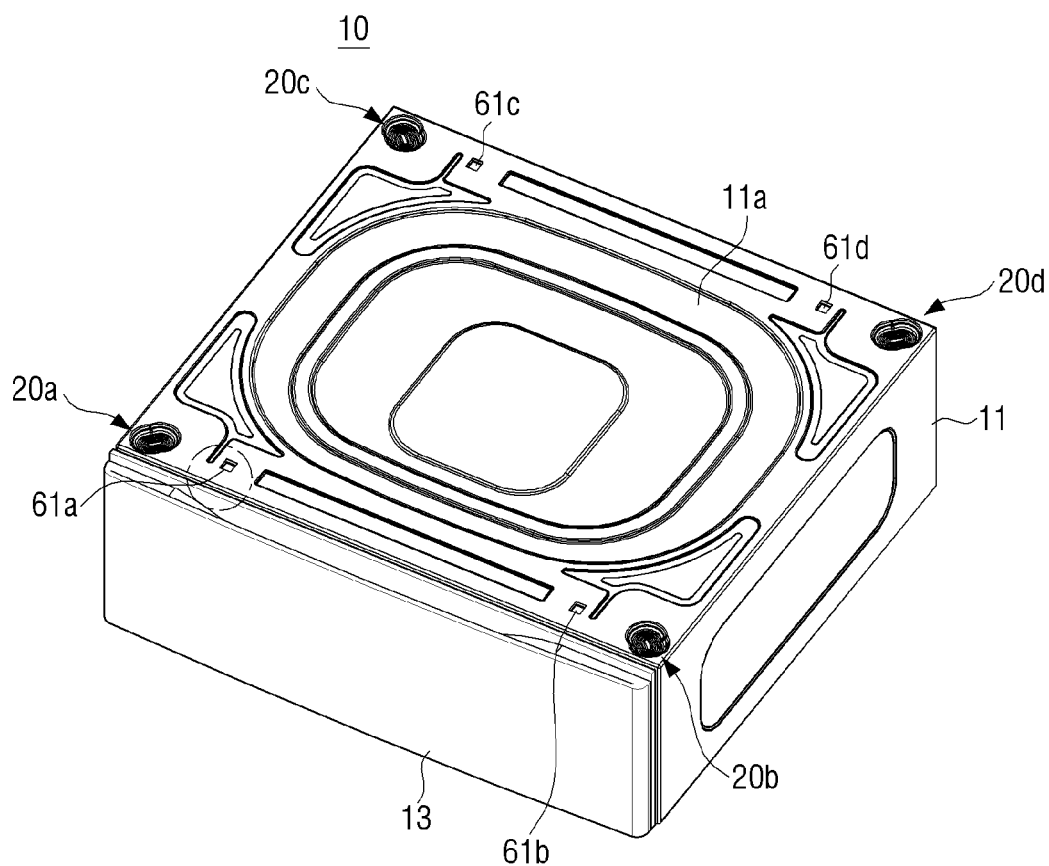
FIG. 2 is a perspective view illustrating the pedestal of FIG. 1.
Figure 4:
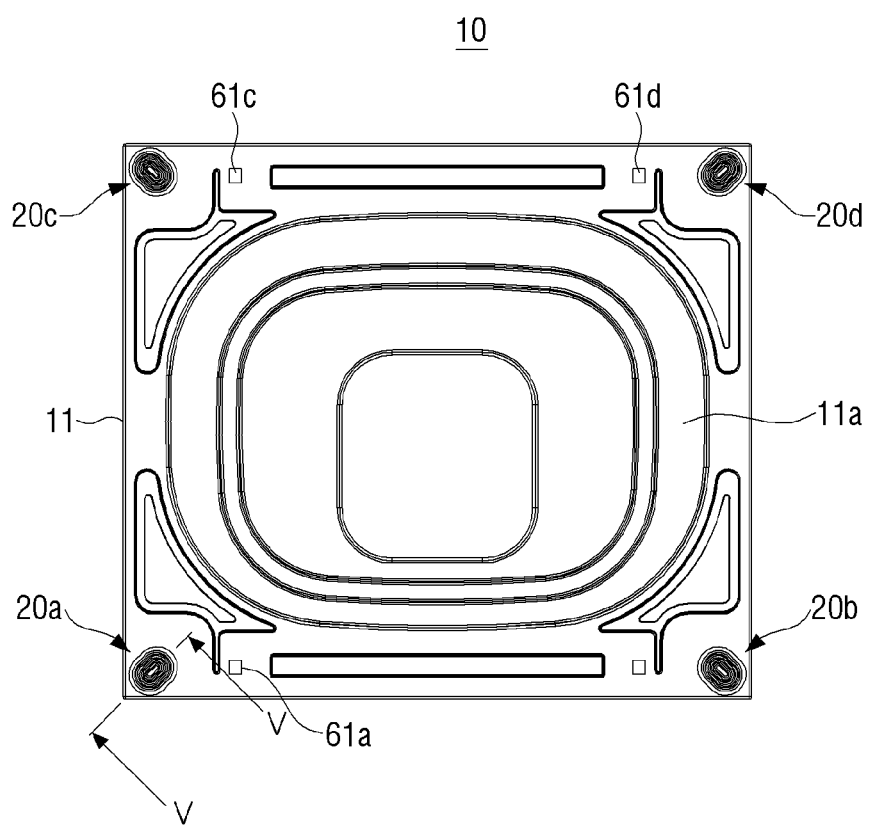
FIG. 4 is a plan view illustrating the pedestal of FIG. 2.

Referring to FIGS. 2 and 4, the pedestal 10 is roughly in a cuboidal shape, and at four corners of the upper portion 11a thereof, a plurality of seat portions 20a to 20d, which are in a recessed shape, are integrally formed with the housing 11.

The plurality of seat portions 20a to 20d form seat points of legs 8 (see FIG. 6) installed at four corners of a bottom surface of the washing machine 1.

Further, the plurality of seat portions 20a to 20d are roughly in the shape of a numeral 8, on the upper portion 11a of the housing 11, and this is to selectively seat any one of the washing machine 1 and the dryer (not illustrated) on the pedestal 10. However, the seat portions may have other shapes, and thus, the present disclosure is not limited thereto.

That is, a plurality of legs (not illustrated) provided at four corners of a bottom portion of the dryer are arranged further inside than a plurality of legs of the washing machine 1. This is to secure a predetermined region in which a gap between a lower end of the dryer and an upper end of the pedestal 10 is sealed by a sealant (e.g., paste type sealant) so as to maintain airtight between the dryer and the pedestal 10 in the case of the dryer.

Since the plurality of seat portions 20a to 20d have the same shape, only one 20a of the plurality of seat portions 20a to 20d will be described.

Figure 3:
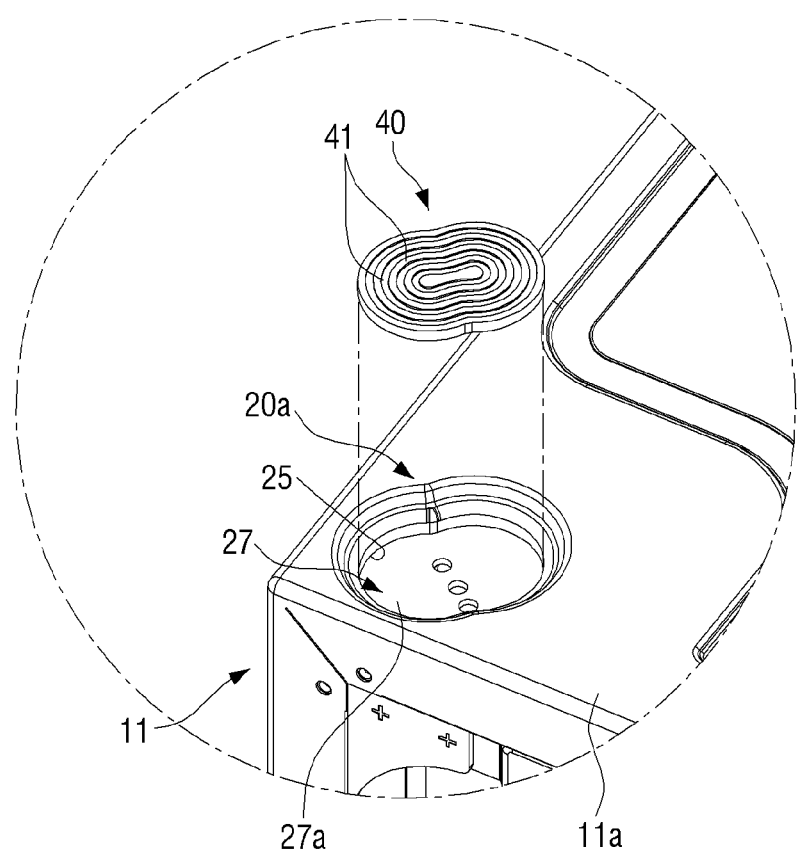
FIG. 3 is an enlarged perspective view illustrating a seat portion of a pedestal on which legs of a washing machine are seated.

Referring to FIG. 3, the seat portion 20a may be formed through a press processing to press four corners of the upper portion 11a of the housing 11 in a direction of the inside of the housing 11.

In this case, the seat portion 20a may be formed to be bent in multistage in a direction of the lower side through the press processing, and an opening 25 is formed on a lower portion thereof. In this case, a frame portion 27 is exposed to an outside of the housing 11 through the respective openings 25 of the plurality of seat portions 20a.

Figure 5:
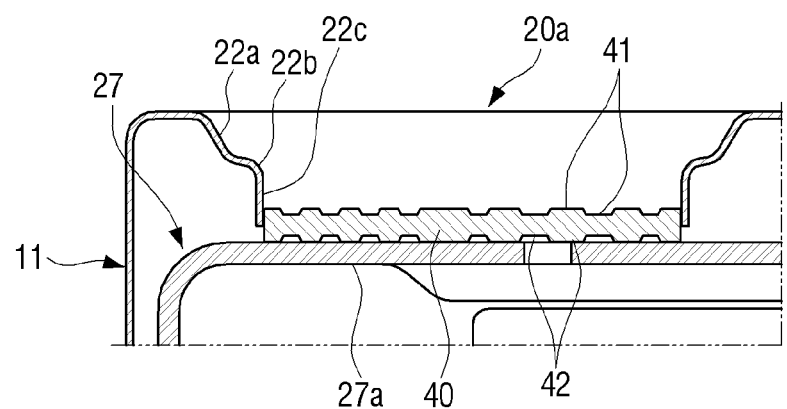
FIG. 5 is a cross-sectional view taken along line V-V of FIG. 4.

Referring to FIG. 5, the multistage bent structure of the seat portion 20a may be formed to be narrower in the direction from the upper portion 11a of the housing 11 to the inside of the housing 11.

The seat portion 20a includes an inclined portion 22a downwardly inclined toward the inside of the seat portion 20a, a curved portion 22b and a straight portion 22c that are successively formed to extend from a lower end of the inclined portion 22a.

When operators lift and put the washing machine 1 on the pedestal 10, the inclined portion 22a guides a bottom portion 8a or a peripheral portion 8b of the leg 8 to the inside of the seat portion 20a so that the leg 8 of the washing machine 1 can be accurately inserted into the seat portion 20a.

The curved portion 22b is a portion that naturally connects the inclined portion 22a and the vertical portion 22c to each other, and guides the bottom portion 8a or the peripheral portion 8b of the leg 8, which is guided along the inclined portion 22a, to a place where the vertical portion 22c is positioned.

For example, the vertical portion 22c may have the same diameter as the diameter of the peripheral portion 8b so that the vertical portion 22c comes in close contact with the peripheral portion 8b without tolerance, and thus the leg 8 can be firmly arranged in the seat portion 20a without movement. However, the present disclosure is not limited thereto.

Figure 6:
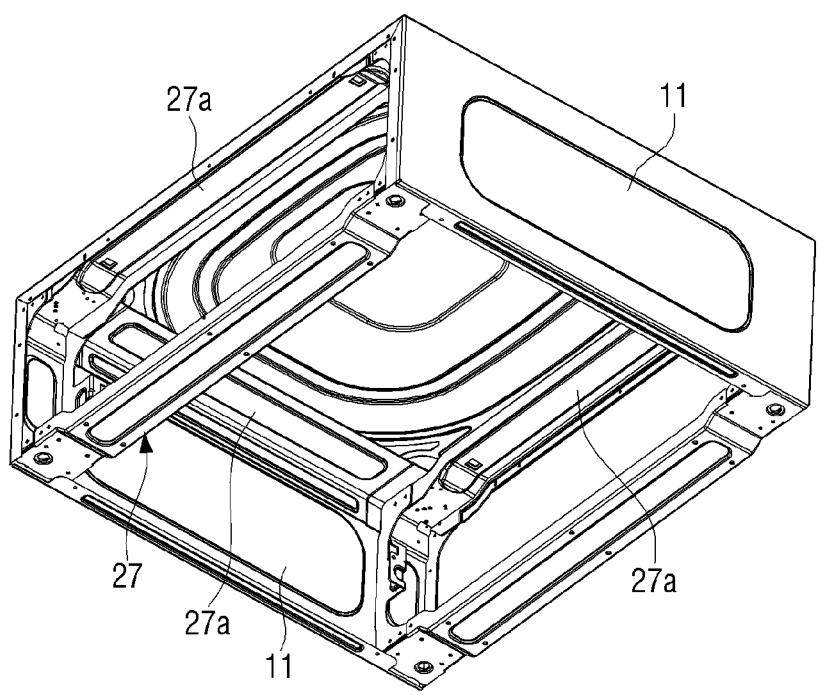
FIG. 6 is a perspective view illustrating a state where a frame portion is arranged on an inside of a housing.

Referring to FIG. 6, the frame portion 27 serves to substantially support the weight of the washing machine 1, and is surrounded by the housing 11.

For example, the frame portion 27 may be formed with a thickness that is thicker than the thickness of the housing 11 to have a predetermined strength. For example, if the thickness of the housing 11 is 5 mm, the frame portion 27 may be formed with a thickness of about 20 mm, however, these are examples, and thus, the present disclosure is not limited thereto.

The frame portion 27 is fastened to the inside of the housing 11 by a typical fastener (not illustrated). In this case, for example, the height of the frame portion 27 is set so that an upper portion 27a of the frame portion 27 is in a position that reaches or is adjacent to the opening 25.

Figure 7:
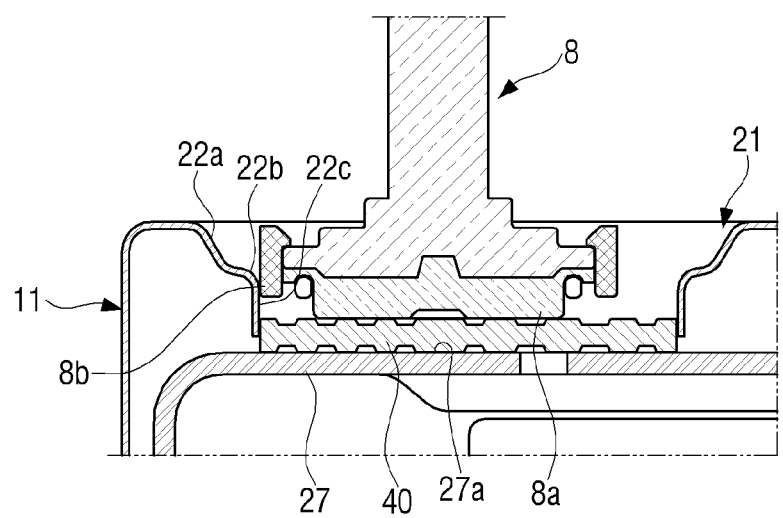
FIG. 7 is a cross-sectional view illustrating a state where a leg of a laundry processor is seated on a seat portion of a pedestal.

Accordingly, a bottom portion 8a of the leg 8 that is guided by the seat portion 20a may be directly seated on the upper portion 27a of the frame portion 27 or may be seated on a vibration absorption member 40 that is seated on the upper portion 27a of the frame portion 27 as shown in FIGS. 5 and 7.

A plurality of vibration absorption members 40 may be provided to be arranged on the plurality of seat portions 20a to 20d, respectively. The vibration absorption member 40 has a predetermined thickness, and the outline of the vibration absorption member 40 substantially corresponds to the vertical portion 22c of the seat portion 20a.

The vibration absorption member 40 may be made of a rubber material or a synthetic resin material having elasticity. When the leg 8 of the washing machine 1 is seated as shown in FIG. 7, the vibration absorption member 40 can elastically support the leg 8 to absorb vibration that is generated when the washing machine 1 operates, and thus walking phenomenon of the leg 8 can be prevented.

Further, the vibration absorption member 40 has first and second anti-skid projections 41 and 42 (see FIGS. 3 and 5) formed on an upper surface and a lower surface thereof to form a plurality of closed curves.

The first and second anti-skid projections 41 and 42 can prevent the leg 8 that is seated on the vibration absorption member 40 from skidding due to the vibration that is generated when the washing machine 1 operates.

For example, according to the drum type washing machine 1, a drum is arranged to be downwardly inclined toward the rear of the washing machine 1, and thus the center of weight is positioned in the rear of the washing machine 1 when the washing machine 1 operates. Accordingly, when the washing machine 1 operates, the washing machine 1 is inclined toward the rear of the washing machine 1 at a predetermined angle, and thus the front portion of the washing machine 1 repeats to be lifted for a predetermined distance and then return to its original position. Accordingly, a pair of legs 8 that are arranged in front of the bottom portion 1a of the washing machine 1 repeat to be separated from the vibration absorption member 40 and to be seated on the vibration absorption member 40.

In this case, when the leg 8 is seated on the vibration absorption member 40, the first anti-skid projection 41 helps the leg 8 to stably land on the vibration absorption member 40 without skidding.

On the other hand, the anti-skid projections 41 and 42 that are formed on the vibration absorption member 40 may be limitedly formed on only one of both surfaces of the vibration absorption member 40, which faces the leg 8 of the washing machine 1. However, depending on embodiments, the anti-skid projections 41 and 42 may be formed on both surfaces of the vibration absorption member 40 for convenience in work when an operator installs the pedestal 10 and the washing machine 1.

Further, according to the example embodiment of the present disclosure described above, the pedestal 10 may further include a plurality of clamping members 50 for fixing the washing machine 1 that is seated on the pedestal 10 to the pedestal 10.

Parts of the plurality of clamping members 50 are positioned between one pair of seat portions 20a and 20b, and the remainders thereof are positioned between the other pair of seat portions 20c and 20d. In this case, the plurality of clamping members 50 may be arranged adjacent to the plurality of seat portions 20a to 20d, respectively.

Referring to FIG. 4, a plurality of second through-holes 61a to 61d are formed at predetermined intervals around the plurality of seat portions 20a to 20d. Further, positions where the plurality of clamping members 50 are installed are positions that correspond to the plurality of second through-holes 61a to 61d. For example, a pair of through-holes 61a and 61b among the plurality of through-holes 61a to 61d are arranged adjacent to the front of the pedestal 10, and the remaining pair of through-holes 61c and 61d are arranged adjacent to the rear of the pedestal 10. Such an arrangement considers an easy access of an operator's hand to the inside of the pedestal 10 when the plurality of clamping members 50 are installed. However, this arrangement is an example, and thus, the present disclosure is not limited thereto.

Figure 8A:
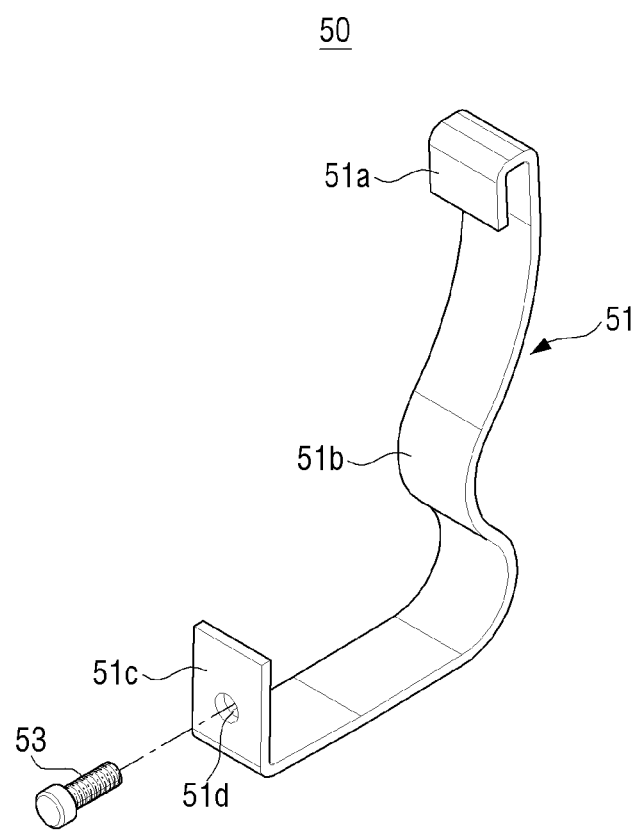
FIG. 8A is a perspective view illustrating a clamping member for fixing a washing machine to a pedestal.

Referring to FIG. 8A, each of the plurality of clamping members 50 includes a single connection member 51 and a fastening screw 53. A hook portion 51a is formed at an upper end of the connection member 51, a curved projection portion 51b is formed near the center thereof, and a bent portion 51c having a screw hole 51d to which the fastening screw 53 is fastened is formed at a lower end thereof.

Figure 8B:
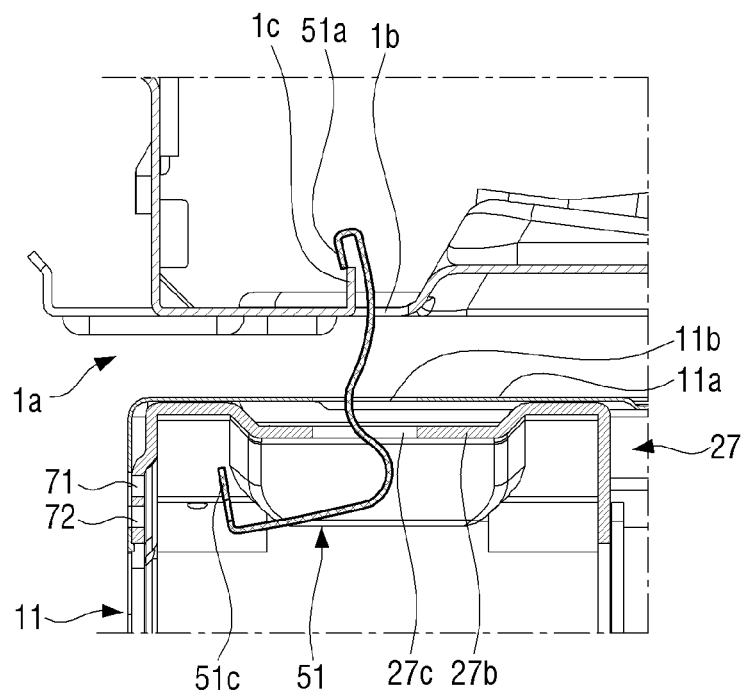
FIGS. 8B and 8C are schematic cross-sectional views explaining a process of fixing a washing machine to a pedestal using the clamping member of FIG. 8A.
Figure 8C:
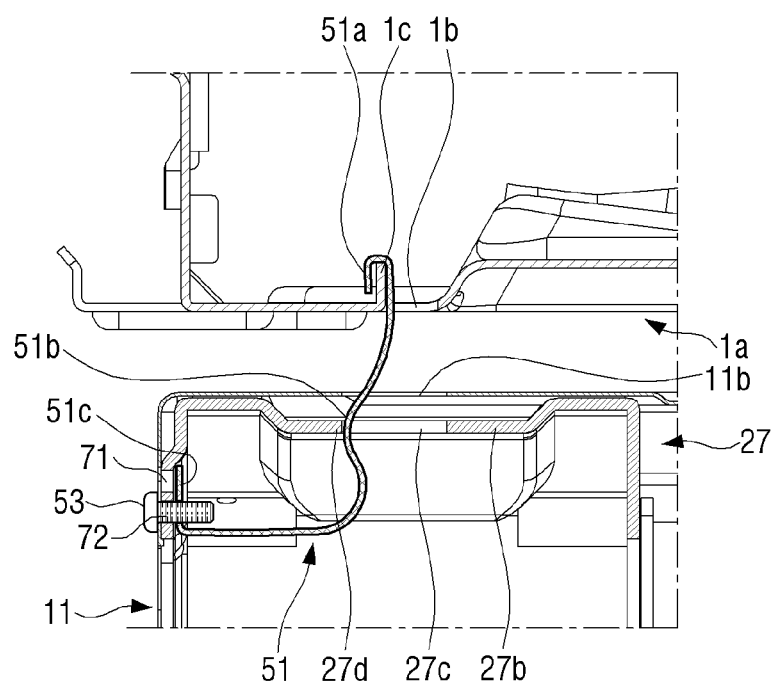

Referring to FIGS. 8B and 8C, a process of fixing the washing machine 1 to the pedestal 10 through the clamping members 50 will be described in order.

First, in a state where a drawer 13 of the pedestal 10 is opened, the connection member 51 is brought to the inside of the drawer 13, and then approaches an installation position.

Then, as shown in FIG. 8B, the hook portion 51a of the connection member 51 is locked to be fixed to a locking protrusion 1c that protrudes around the first through-hole 1b after successively passing through the first through-hole 27b formed on the frame portion 27, the second through-hole 11b of the housing 11, and the first through-hole 1b formed on the bottom portion 1a of the washing machine 1.

In this state, as shown in FIG. 8C, in a state where the bent portion 51c of the connection member 51 is pulled toward the frame portion 27 on which a plurality of holes 71 and 72 are formed, the fastening screw 53 may be fastened to any one of the plurality of holes 71 and 72 and the screw hole 51d of the bent portion 51c to fix the bent portion 51c of the connection member 51 to the frame portion 27.

In this case, since the hook portion 51a of the connection member 51 is formed to be locked on the locking protrusion 1c, the hook portion 51a can be easily fixed to the locking protrusion 1c even without operator's confirmation with the naked eye.

Through the above-described installation process, an operator can install the clamping member 50 in a state where the washing machine 1 and the pedestal 10 are not laid down on the floor but are in a stand state, and thus the work efficiency can be improved.

On the other hand, since the plurality of clamping members 50 that are installed on the washing machine 1 and the pedestal 10 are not exposed to an outside but are naturally concealed, visibility can be improved. That is, an operator can install the clamping member 50 in a state where the washing machine 1 stands on the pedestal 10.

As described above, in the process of fastening the bent portion 51c of the connection member 51 to the frame portion 27 through the fastening screw 53, the hook portion 51c of the connection member 51 is pulled toward the pedestal 10. In this case, the projection portion 51b presses an inner periphery 27d of the first through-hole 27b of the frame portion 27, and the washing machine 1 is pulled toward the pedestal 10. As a result, the plurality of legs 8 of the washing machine 1 strongly comes in close contact with the side of the frame portion 27, and thus the washing machine 1 can be firmly fixed to the pedestal 10.

Figure 9:
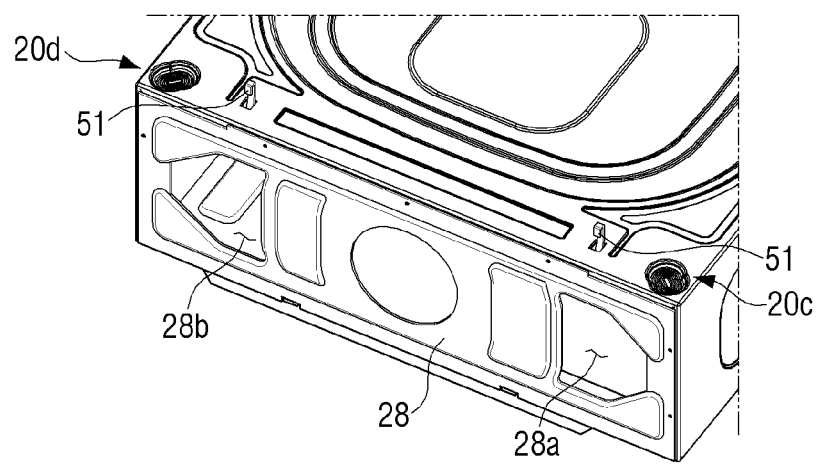
FIG. 9 is a perspective view illustrating the rear of the pedestal of FIG. 2.

On the other hand, in the case where the clamping member 50 are installed in the rear of the pedestal 10, as shown in FIG. 9, the operator can perform the installation work in a state where the connection member 51 is put into the inside of the pedestal 10 through a pair of through-holes 28a and 28b formed on both sides of a rear cover 28 installed on the housing 11 with a size enough for the operator's hand to pass therethrough.

Hereinafter, referring to FIGS. 10 to 12, the configuration of a pedestal 100 according to another example embodiment of the present disclosure will be described. The configuration of the pedestal 100 including a housing 111 and a plurality of seat members 120a to 120d is mostly similar to the configuration of the pedestal 10 according to the example embodiment as described above, but the structure of clamping members 150, a part of the pedestal 100 for installing the clamping members 150, and a part of a bottom portion 1a of the washing machine 1 of the pedestal 100 according to this example embodiment of the present disclosure are different from those of the pedestal 10 according to the example embodiment described above. In explaining the pedestal 100 according to this example embodiment, explanation of the same configuration as the configuration of the pedestal 10 according to the example embodiment as described above will be omitted.

Figure 10:
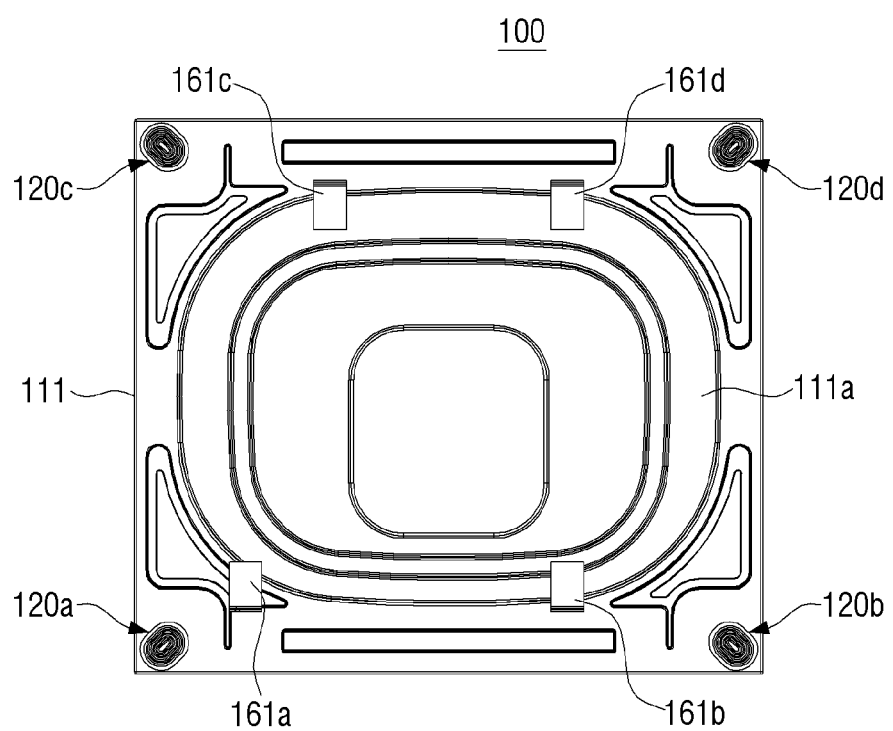
FIG. 10 is a plan view illustrating a pedestal according to another example embodiment of the present disclosure.

Referring to FIG. 10, a housing 111 includes a plurality of second through-holes 161a to 161d which are formed on an upper portion 111a thereof and through which a plurality of clamping members 150 pass.

Figure 11A:
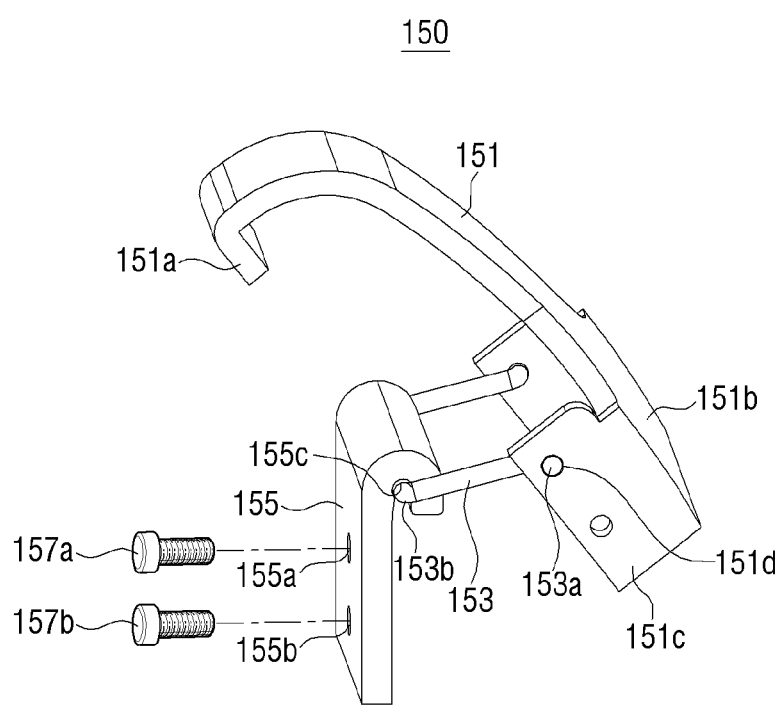
FIG. 11A is a perspective view illustrating a clamping member applied to the pedestal of FIG. 10.

Referring to FIG. 11A, each clamping member 150 includes a connection member 151, a link 153, a fixed piece 155, and a plurality of fastening screws 157a and 157b.

The connection member 151 includes one end at which a hook portion 151a is formed to be fixedly locked on a locking protrusion 1c formed to project to an inside of a bottom portion 1a of the washing machine 1, and the other end at which a pressing portion 151b that is pressed by an operator is formed.

The link 153 connects the connection member 151 and the fixed piece 155 to each other. For this, one end 153a of the link 153 is hinge-connected to a rib portion 151c that is formed to extend from the pressing portion 151b, and the other end 153b of the link 153 is hinge-connected to a groove 155c of the fixed piece 155.

The fixed piece 155 is fixed to a part of the frame portion 127 through a plurality of fastening screws 157a and 157b. In this case, it is also possible to fix the fixed piece 155 to a part of the frame portion 127 through another fastening means, such as rivets, instead of the plurality of fastening screws 157a and 157b, and thus, the present disclosure is not limited to the use of fastening screws 157a and 157b.

A process of fixing the washing machine 1 to the pedestal 100 through the clamping member 150 as configured above is as follows.

Figure 11B:
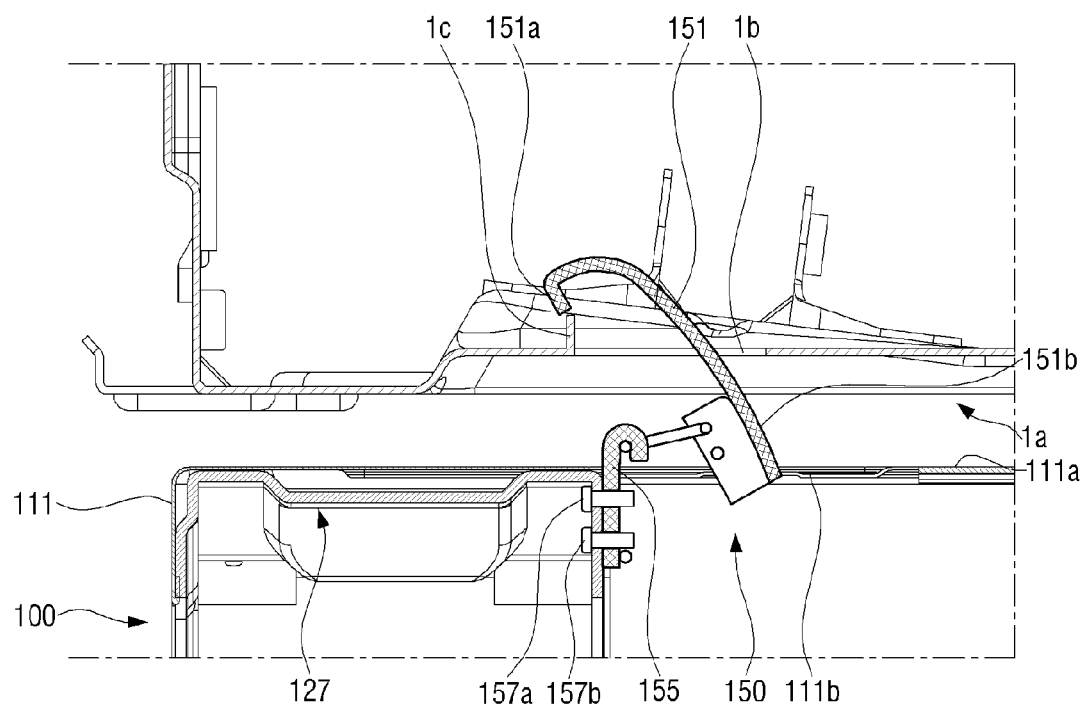
FIGS. 11B and 11C are schematic cross-sectional views explaining a process of fixing a washing machine to a pedestal using the clamping member of FIG. 11A.

As shown in FIG. 11B, the fixed piece 155 is fixedly fastened to a part of the frame portion 127 through the plurality of fastening screws 157a and 157b. In this case, an operator may directly fix the fixed piece 155 of the clamping member 150 to a part of the frame portion 127 on the spot, but fixing of the clamping member 150 is not limited thereto. It is also possible to fix the fixed piece 155 to a part of the frame portion 127 on an assembly line that is a pre-stage of merchandising.

Thereafter, the hook portion 151a of the connection member 151 is fixedly locked on the locking protrusion 1c that is formed on the bottom portion 1a of the washing machine 1 to protrude to the inside of the washing machine 1 after successively passing through the second through-hole 111b of the housing 111 and the first through-hole 1b of the bottom portion 1a of the washing machine 1.

Figure 11C:
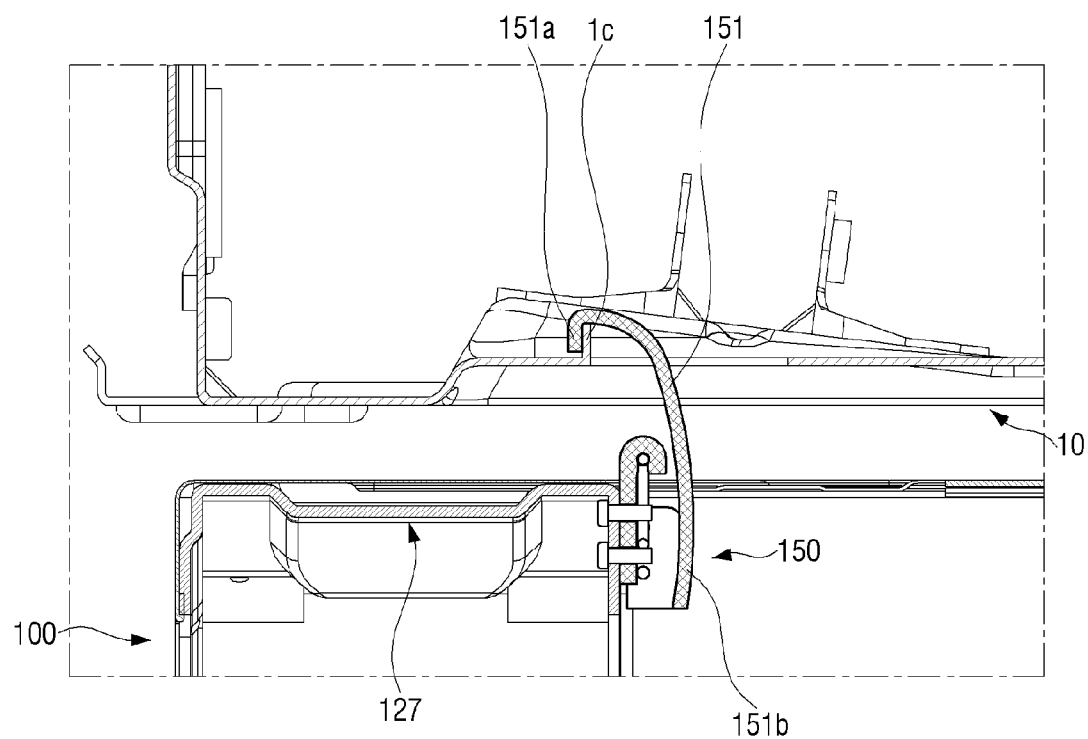

In this state, if the pressing portion 151b of the connection member 151 is pressed in a direction that is downwardly inclined toward the side of the fixed piece 155, the connection member 151 is substantially vertically arranged as shown in FIG. 11C, and thus the hook portion 151a of the connection member 151 pulls the locking protrusion 1c toward the side of the pedestal 100. Accordingly, the clamping member 150 is arranged between the washing machine 1 and the pedestal 100 in an urged state to firmly fix the washing machine 1 to the pedestal 100.

Figure 12:
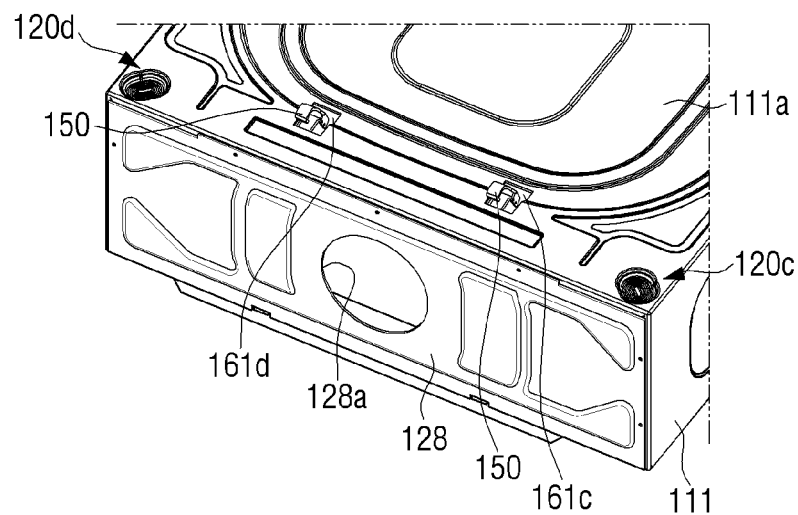
FIG. 12 is a perspective view illustrating the rear of the pedestal of FIG. 10.

On the other hand, in the case where the clamping member 150 is installed in the rear of the pedestal 100, as shown in FIG. 12, an operator can put his/her hand into a single through-hole 128a that is formed substantially in the center of a rear cover 128 installed on the housing 111, and thus can easily perform the installation work of the clamping member 150.

On the other hand, in addition to the clamping members 50 and 150 according to the example embodiments as described above, clamping members 250 and 350 having various structures as illustrated in FIGS. 13A to 14C can firmly fix the washing machine 1 to the 10 and 100, as well.

Figure 13A:
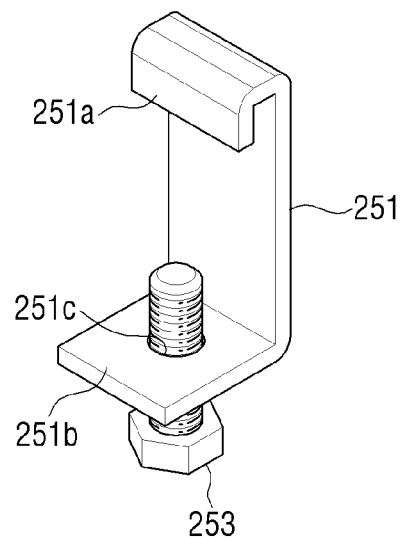
FIG. 13A is a perspective view illustrating another example of a clamping member.
Figure 13B:
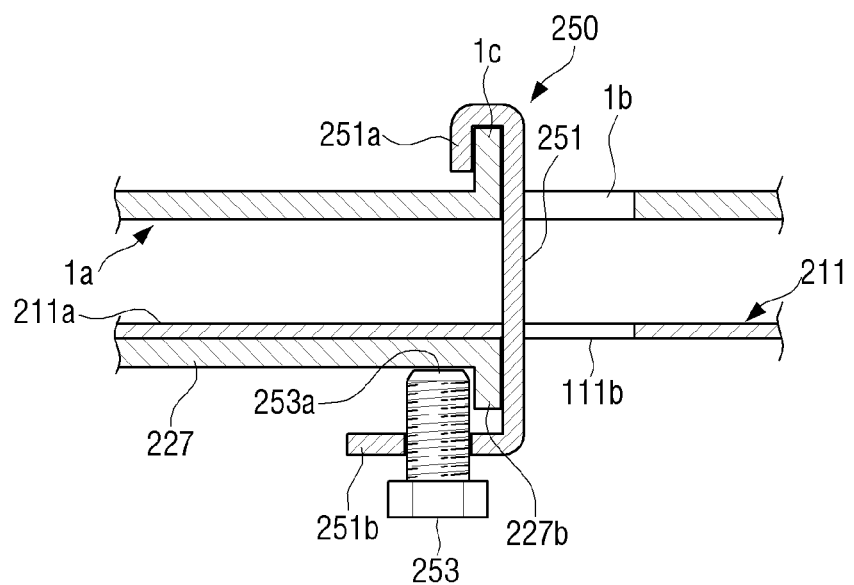
FIG. 13B is a cross-sectional view illustrating a state where a washing machine is fixed to a pedestal using the clamping member of FIG. 13A.

First, referring to FIGS. 13A and 13B, the clamping member 250 may include a connection member 251 and a fastening screw 253.

The connection member 251 has one end at which a hook portion 251a is formed and the other end at which a bent portion 251b is formed. A screw hole 251c, through which the fastening screw 253 is fastened, is formed on the bent portion 251b.

Referring to FIG. 13B, a process of installing the clamping member 250 will be described. First, in a state where the hook portion 251a of the connection member 251 is fixedly locked on the first locking protrusion 1c of the bottom portion 1a of the washing machine 1, the bent portion 251b of the connection member 251 is positioned adjacent to the lower side of a part of the frame portion 227, and then the fastening screw 253 is fastened to the screw hole 251c of the bent portion 251b.

In this case, by rotating the fastening screw 253, a front end portion 253a of the fastening screw 253 presses a part of the frame portion 227, and thus the hook portion 251a of the connection member 251 pulls the first locking protrusion 1c toward the upper portion 211a of the housing 211 to make the clamping member 250 in a locking state. Accordingly, the washing machine 1 is pulled toward the pedestal side, and thus can be firmly fixed to the pedestal.

Around a part of the frame portion 227 that is pressed by the fastening screw 253, a second locking protrusion 227b is formed to project toward the inside of the housing 211. As the fastening screw 253 is fastened, force by which the front end portion 253a of the fastening screw 253 presses the frame portion 227 is increased, and thus the second locking protrusion 227b is prevented from skidding on the pressed surface of the frame portion 227 to secede from the frame portion 227.

Figure 14A:
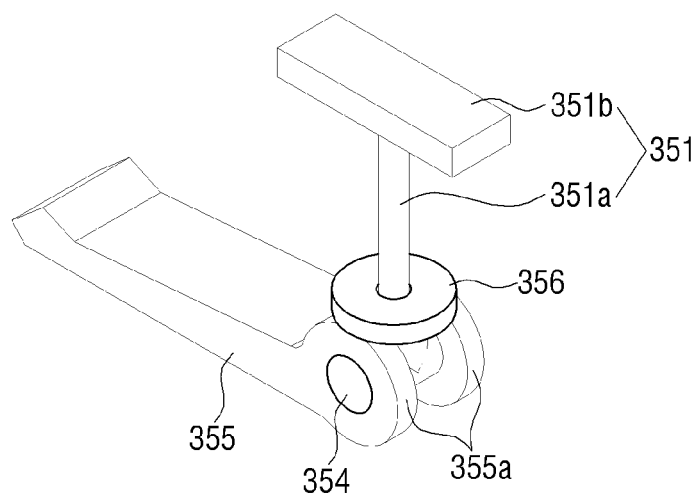
FIG. 14A is a perspective view illustrating still another example of a clamping member.

In addition, referring to FIG. 14A, the clamping member 350 may include a connection member 351, a lever member 355, and a washer 356.

The connection member 351 may include a vertical rod 351a, and a holding piece 351b that is formed to extend from one end of the vertical rod 351a. In this case, as an example, the holding piece 351b may be formed substantially at right angles to the length direction of the vertical rod 351a.

The lever member 355 is hinge-connected to the other end of the vertical rod 351a through a hinge piece 354. In this case, a cam portion 355a is formed on one portion of the lever member 355 that corresponds to a hinge pin 354. Since the cam portion 355a is formed to project substantially in a semi-elliptical shape, a part of a frame portion 327 may be selectively pressed or press-released through rotating of the lever member 355 in one direction or in an opposite direction at a predetermined angle.

The washer 356 is coupled to the vertical rod 351a, and if the lever member 355 swings toward the side of the frame portion 327, the washer 356 is pressed toward the side of the frame portion 327 by the cam portion 355a.

Figure 14B:
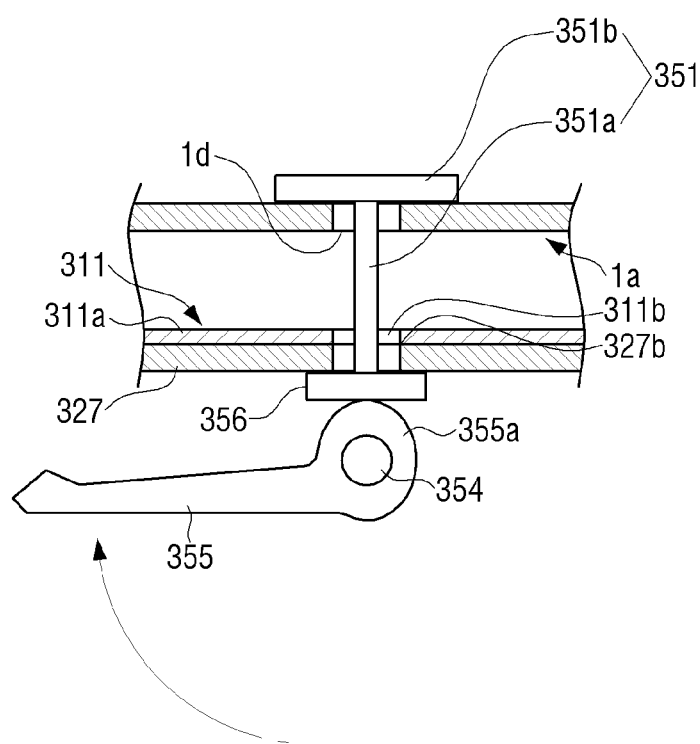
FIG. 14B is a cross-sectional view illustrating a state where a washing machine is fixed to a pedestal using the clamping member of FIG. 14A.
Figure 14C:
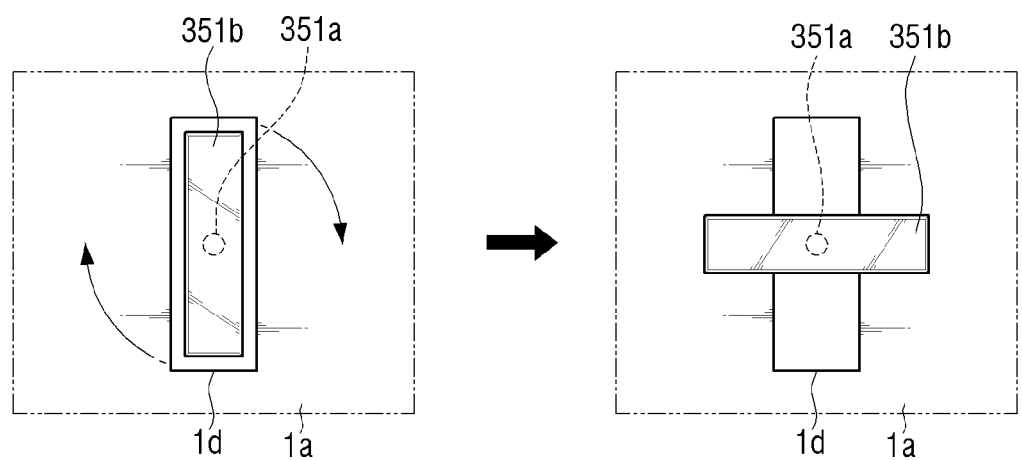
FIG. 14C is a schematic view illustrating a state where a locking piece of the clamping member of FIG. 14A is held on a bottom portion of a washing machine.

Referring to FIGS. 14B and 14C, in order to install the clamping member 350, the holding piece 351b of the connection member 351 is rotated at a predetermined angle so that the holding piece 351b is held on the bottom portion 1a of the washing machine 1 after successively passing through the through-holes 327b, 311b, and 1d of the frame portion 327, the housing 311, and the bottom portion 1a of the washing machine 1.

If the lever member 355 is rotated toward the frame portion 327 and the upper portion of the housing 311a in this state, the cam portion 355a swings about the hinge pin 354 together with the lever member 355 to press the frame portion 327 through the washer 356. Accordingly, the clamping member 350 becomes in a locking state, and the washing machine 1 is pulled toward the pedestal to be firmly fixed to the pedestal.

The clamping members 50, 150, 250, and 350 as described above have somewhat different configurations, but commonly pull the washing machine 1 toward the pedestals 10 and 100 to improve the mutual fixing force between the washing machine 1 and the pedestals 10 and 100.

Although a few embodiments have been shown and described, it would be appreciated by those skilled in the art that changes may be made in these embodiments without departing from the principles and spirit of the invention, the scope of which is defined in the claims and their equivalents.

What is claimed is:
1. A pedestal comprising:
   a frame portion configured to seat a plurality of legs coupled to a bottom surface of a laundry processor;
   a housing configured to surround the frame portion; and a plurality of seat portions recessively formed on an upper portion of the housing to form a plurality of leg seat points, wherein the plurality of seat portions are formed to be bent in multiple stages, each of the plurality of seat portions including an inclined portion extending from the upper portion of the housing and inclined at a first non-horizontal angle, curved portion extending from the inclined portion, and a vertical straight portion extending from the curved portion.

2. The pedestal as claimed in claim 1, wherein the plurality of seat portions form openings to expose a part of the frame portion.

3. The pedestal as claimed in claim 2, wherein the multiple stages are formed so that the seat portions become narrower in a direction from an upper portion of the housing to an inside of the housing.

4. The pedestal as claimed in claim 2, further comprising a plurality of clamping members each of which has one end that is configured to be connected to the laundry processor and a second end that is connected to the frame portion in order to fix the laundry processor to the pedestal.

5. The pedestal as claimed in claim 4, wherein the plurality of clamping members are configured to pull the laundry processor toward the pedestal in a locking state.

6. The pedestal as claimed in claim 4, wherein the plurality of clamping members are configured to simultaneously penetrate a bottom portion of the laundry processor and the upper portion of the housing when the pedestal is coupled to the laundry processor.

7. The pedestal as claimed in claim 4, wherein each of the plurality of clamping members comprises one end portion that is configured to be separably locked and fixed to a part of the laundry processor and a second end portion that is screw-fastened to the frame portion.

8. The pedestal as claimed in claim 7, wherein each of the plurality of clamping members comprises:

a connection member including a hook portion configured to be fixed to a locking protrusion formed on a bottom portion of the laundry processor, a bent portion screw-fastened to the frame portion, and a projection portion provided between the hook portion and the bent portion to press a part of the frame portion; and a fastening screw screw-fastened to the bent portion through the housing and the frame portion.

9. The pedestal as claimed in claim 4, wherein each of the plurality of clamping member comprises one end portion that is configured to be separably locked and fixed to a part of the laundry processor and a second end portion that is pressingly fixed to a part of the frame portion.

10. The pedestal as claimed in claim 9, wherein each of the plurality of clamping members comprises:

a connection member including a hook portion configured to be separably fixed to a locking protrusion formed on a bottom portion of the laundry processor;

a fixed piece fixed to the frame portion; and a link having one end hinge-connected to the connection member and a second end hinge-connected to the fixed piece, wherein the connection member maintains the clamping member in a locked state through pressing of the hook portion toward the fixed piece in a state where the hook portion is fixed to the locking protrusion.

11. The pedestal as claimed in claim 9, wherein each of the plurality of clamping members comprises:

a connection member including a hook portion configured to be separably locked and fixed to a first locking protrusion formed on a bottom portion of the laundry processor and a bent portion having a fastening hole formed thereon; and a fastening screw fastened to the fastening hole and having a front end portion that presses the frame portion.

12. The pedestal as claimed in claim 11, wherein the frame portion further comprises a second locking protrusion to fix the fastening screw to the frame portion.

13. The pedestal as claimed in claim 9, wherein each of the plurality of clamping members comprises:

a connection member including a vertical rod and a holding piece formed at one end of the vertical rod at right angles to the vertical rod; and a lever member hinge-connected to a second end of the vertical rod, wherein the lever member maintains the clamping member in a locked state when the lever member is rotated toward the frame portion in a state where the holding piece is configured to be locked and fixed to a bottom portion of the laundry processor.

14. The pedestal as claimed in claim 1, wherein the plurality of seat portions are "8"-shaped so that positions of the plurality of legs correspond to different seat points of the laundry processor.

15. The pedestal as claimed in claim 1, further comprising a plurality of vibration absorption members arranged on the plurality of seat portions.

16. The pedestal as claimed in claim 15, wherein each of the plurality of vibration absorption members comprises first and second anti-skid projections formed on an upper surface and a lower surface thereof, respectively, to form a plurality of closed curves.

17. A laundry processing apparatus comprising:

a laundry processor; and a pedestal including a frame portion on which a plurality of legs coupled to a bottom surface of the laundry processor are seated, a housing configured to surround the frame portion, and a plurality of seat portions recessively formed on an upper portion of the housing to form a plurality of leg seat points, wherein the plurality of seat portions are formed to be bent in multiple stages, each of the plurality of seat portions including an inclined portion extending from the upper portion of the housing and inclined at a first non-horizontal angle, a curved portion extending from the inclined portion, and a vertical straight portion extending from the curved portion.

18. The laundry processing apparatus as claimed in claim 17, wherein the plurality of seat portions form openings to expose a part of the frame portion.

19. The laundry processing apparatus as claimed in claim 17, further comprising:

a plurality of vibration absorption members arranged on the plurality of seat portions; and a plurality of clamping members configured to fix the laundry processor to the pedestal.

* * * * *